United States Patent Office 3,064,853
Patented Nov. 20, 1962

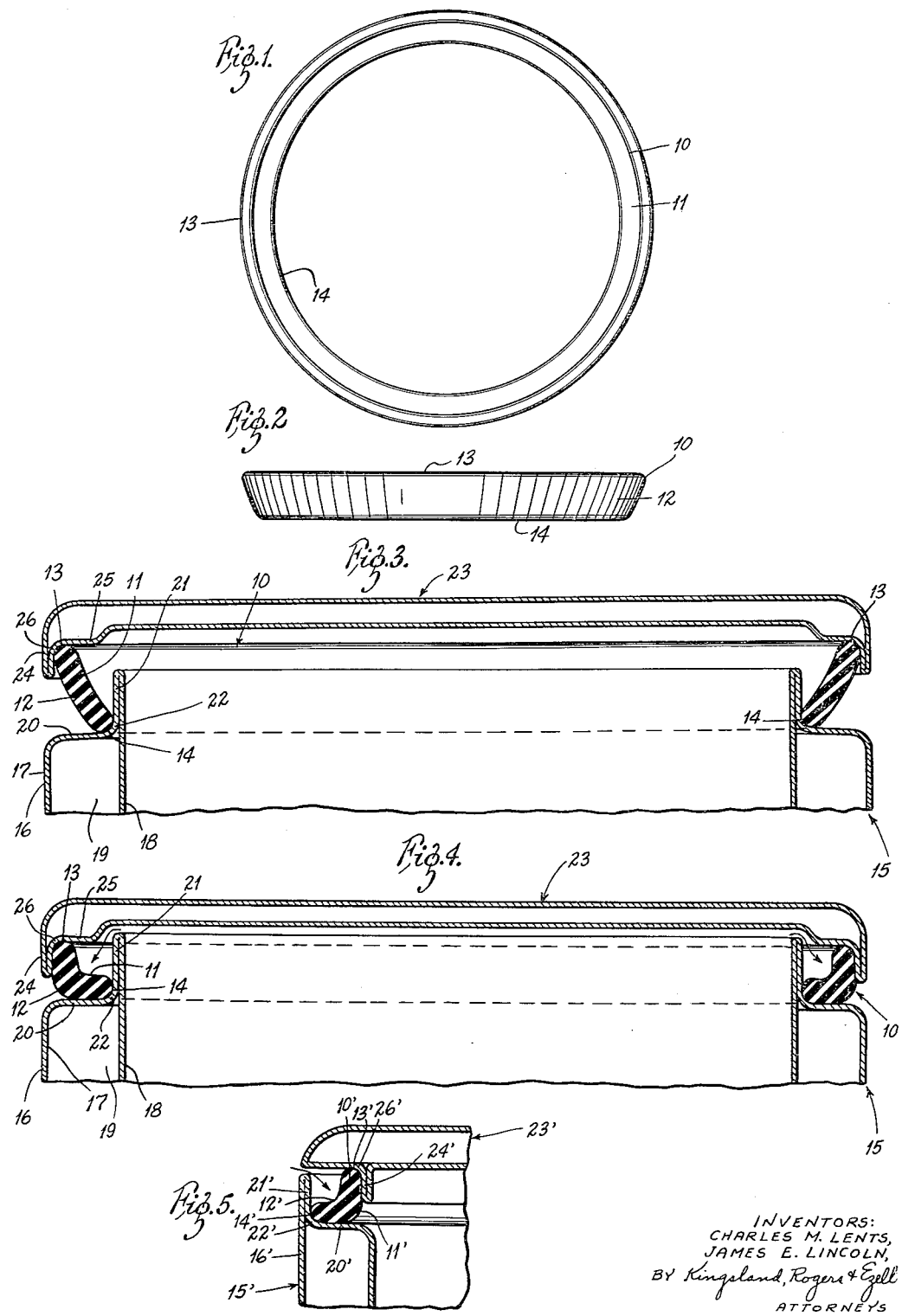

3,064,853
SEAL
Charles M. Lents and James E. Lincoln, Dallas, Tex., assignors to John E. Mitchell Company, Dallas, Tex., a corporation of Missouri
Filed Dec. 30, 1959, Ser. No. 862,879
3 Claims. (Cl. 220—46)

The present invention relates to a gasket or seal for use between a container and a lid to provide a fluid-tight seal. The invention more particularly relates to a gasket which has deformation characteristics such that the pressure of the fluid against the gasket tends to increase the sealing characteristics of it.

The gasket is illustrated as being of endless formation, although other forms are possible, depending upon the shape of the vessel which is to be sealed. Also, uses with other than a container and lid are possible.

The gasket is designed with a top and bottom offset from one another so that the gasket will bend under pressure. Therefore it is an object of the invention to provide a gasket which will bend under pressure, thereby increasing its sealing propensities.

Another object of the invention is to provide a gasket for a container and lid, or the like, which will provide an extremely effective seal while yet permitting ready pressure of the lid against the container.

Another object of the invention is to provide a gasket which not only compresses but deforms under pressure so as to increase the effective sealing area.

Other objects and advantages will be apparent from the description to follow.

In the drawings:

FIGURE 1 is a plan view of the gasket;

FIGURE 2 is a side elevation view of the gasket;

FIGURE 3 is an enlarged view in section showing the gasket in an uncompressed condition between a container and a lid;

FIGURE 4 is a view in section similar to FIGURE 3 but showing the lid pressed toward the container, thereby compressing the gasket; and FIGURE 5 is a partial view in section showing an alternate arrangement of the gasket.

The gasket is illustrated as comprising a ring 10. This gasket is made of resilient rubber, plastic, or the like. As before stated, other forms than the ring type are definitely feasible in the practice of the invention as will appear. The ring form is shown because the gasket is shown as employed to seal a circular container and lid.

FIGURE 3 shows the gasket positioned between a container and a lid for the container, and the gasket of FIGURE 3 is in its non-deformed condition. In other words, the lid of FIGURE 3 is applying no pressure to the gasket.

As shown in FIGURE 3, the gasket has an inner side 11, an outer side 12, a top side 13 and a bottom side 14. The inner and outer sides 11 and 12, respectively, define the thickness of the gasket, which is considerably less than the distance between the top 13 and the bottom 14.

The inner side wall 11 is slightly curved in shape, resembling a concave formation in cross-section. On the other hand, the outer side wall 12 resembles a convex curve in cross-section. The two walls 11 and 12 are generally parallel to one another, although this feature need not be strictly adhered to. Both the top 13 and bottom 14 are preferably curved as shown.

The gasket is designed to be used with various shaped containers including a container of the type illustrated in FIGURE 3. This container 15 has a side wall 16 which is relatively thick and may be formed in two sheets 17 and 18 with a hollow space 19 between them. Toward the upper end of the wall 16 there is a shelf 20, the shelf 20 extends inwardly of the outer sheet 17. At the inner side of the shelf 20 is a rim 21. Between the shelf 20 and the rim 21 is a seat 22.

The lid preferred to be used with the gasket is indicated by numeral 23 and has a side flange 24. Inwardly of the side flange 24 is an outer horizontal ceiling 25 which is joined to the flange 24 by a seat 26.

The gasket 10 is designed to be placed between the container and the lid with the top 13 of the gasket resting against the seat 26 of the lid 23 and the bottom 14 of the gasket resting against the seat 22 of the container 15.

When the lid 23 is pressed toward the container 15 and latched in place (by conventional latching means, not shown) the gasket 10 is compressed and deformed or bent to the shape indicated in FIGURE 4. Under this pressure, the gasket bends so that the inner side wall 11 is compressed while the outer side wall 12 is stretched or placed in tension. As clearly illustrated in FIGURE 4, this bending of the gasket 10 causes an upper portion of the outer side wall 12 to press against the flange 24 of the lid 23. This is in addition to the sealing by the surface of the top 13, which is pressed against the seat 26. Also, a lower portion of the outer side walls 12 presses against the shelf 20 of the container 15 forming an additional sealing surface with the bottom 10, which remains pressed against the seat 22.

The gasket of FIGURES 3 and 4 has outstanding sealing characteristics against pressures from within the container. These pressures, as illustrated by the arrows in FIGURE 4, instead of escaping between the seal and either the lid or the container, tend to press additional portions of the outer side wall 12 against the before mentioned surfaces of the lid and the container. Thus, the very pressure against which the seal is sought to act, aids in enhancing the sealing properties of that seal.

FIGURE 5 illustrates an alternate form of the invention in which the gasket is intended to resist pressures from outside of the container. In other respects, the arrangement is similar to that of FIGURE 4 so that the numerals have been duplicated with primes added. In this embodiment, the rim 21' of the container 15' is parallel to the outer surface of the side 16'. Therefore, the seat 22' between the rim 21' and the shelf 20' is oppositely located from that of FIGURE 4. Likewise, the seat 26' of the lid 23' is located inwardly of the lid as indicated by the position of the flange 24'.

Also in this embodiment, the outer side surface 12' has a generally concave shape before being compressed while the inner side surface 11' has a convex shape. When the gasket 10' is deformed under the pressure of the lid 23' against the container 15' it assumes the bent shape illustrated in FIGURE 5. This shape is designed to withstand pressures from outside the container, as indicated by the arrow of FIGURE 5.

These pressures tend to further seat the gasket against the flange 24' and the seat 26' as well as the shelf 20' and the seat 22'.

Various changes and modifications may be made within the process of this invention as will be readily apparent to those skilled in the art. Such changes and modifications are within the scope and teaching of this invention as defined by the claims appended hereto.

What is claimed is:

1. A container, lid and fluid seal therefor wherein the container comprises a vessel having an open end, a shoulder on the wall of the container adjacent the open end and a substantially vertical wall extending upwardly from one side of the shoulder, the lid having a shoulder above the container shoulder and having a substantially vertical wall extending downwardly from one side of the lid shoulder, the container and lid walls being spaced laterally from one another, the seal comprising a ring surrounding the open end of the container, the ring having an upper end and a lower end spaced laterally from one another and having inclined side walls joined to the upper and lower ends, the upper end of the seal abutting the juncture between the shoulder and the substantially vertical wall on the lid and the lower end of the seal abutting the juncture between the shoulder and the substantially vertical wall on the container, the seal being bendable when the lid is pressed toward the container to increase the area of contact between the seal and the shoulders and substantially vertical walls, and the direction of pressure against the seal produced by the fluid which tends to leak past the seal being against the side of the seal which is opposite the increased contact areas.

2. The combination of claim 1 wherein when the seal is bent, one of its sides is convex and the other concave, and the external pressure on the concave side is greater than the external pressure on the convex side.

3. A container, a lid and seal combination wherein the container has an open end and the seal fits between the lid and the open end of the container, a vertical wall on the container surrounding the opening, a vertical wall on the lid surrounding the opening, the vertical walls being laterally spaced whereby one surrounds the other to provide outer and inner vertical walls, a substantially horizontal wall on the container at the lower end of the container vertical wall, a substantially horizontal wall on the lid at the upper end of the lid vertical wall, the horizontal wall at the end of the outer vertical wall extending inwardly therefrom, the horizontal wall as the end of the inner vertical wall extending outwardly therefrom, the seal comprising a ring having an upper end and a lower end laterally offset from one another, the upper end being positioned against the horizontal and vertical walls on the lid, the lower end being positioned against the horizontal and vertical walls on the container, the cross-section of the seal being taller than it is wide and the sides of the seal being bendable when the lid is pressed toward the container with the side exposed to the direction from which leakage is likely to occur being concave and the other side being convex.

References Cited in the file of this patent

UNITED STATES PATENTS

| | | |
|---|---|---|
| Re. 15,259 | Hammer | Jan. 3, 1922 |
| 2,380,396 | Berthold | July 31, 1945 |

FOREIGN PATENTS

| | | |
|---|---|---|
| 807,850 | France | Oct. 26, 1936 |
| 548,240 | Great Britain | Oct. 1, 1942 |